United States Patent [19]

Miller, Jr. et al.

[11] 3,823,873

[45] July 16, 1974

[54] VAPOR RELEASING DEVICE

[75] Inventors: Alexander Miller, Jr., Modesto, Calif.; Victor F. Anderson, Wenonah, N.J.; Raymond W. Holt, Pleasant Hills; Robert W. Fortenbach, Lafayette, both of Calif.

[73] Assignee: Shell Oil Company, Houston, Tex.

[22] Filed: Jan. 15, 1973

[21] Appl. No.: 323,547

[52] U.S. Cl. .................................. 239/54, 239/56
[51] Int. Cl. ........................................... A24f 25/00
[58] Field of Search .......................... 239/53–60; 220/41

[56] References Cited
UNITED STATES PATENTS

| | | | |
|---|---|---|---|
| 1,074,714 | 10/1913 | Guenther et al. | 239/55 |
| 1,552,877 | 9/1925 | Phillipps et al. | 239/53 |
| 1,954,765 | 4/1934 | Fessler | 239/57 |
| 3,685,734 | 8/1972 | Paciorek et al. | 239/56 |

Primary Examiner—Robert S. Ward, Jr.
Assistant Examiner—John J. Love

[57] ABSTRACT

A vapor releasing device for reodorants, pesticides or other vaporous materials is defined by a flat upper portion having opposing downwardly extending walls which contain inwardly protruding lips forming slots or openings. A flexible solid containing the vaporous material is engaged in the slot or openings. Extending downwardly from the upper portion at each end of the slot or opening is a post which prevents removal or fallout of the flexible solid when engaged.

12 Claims, 5 Drawing Figures

PATENTED JUL 16 1974 3,823,873
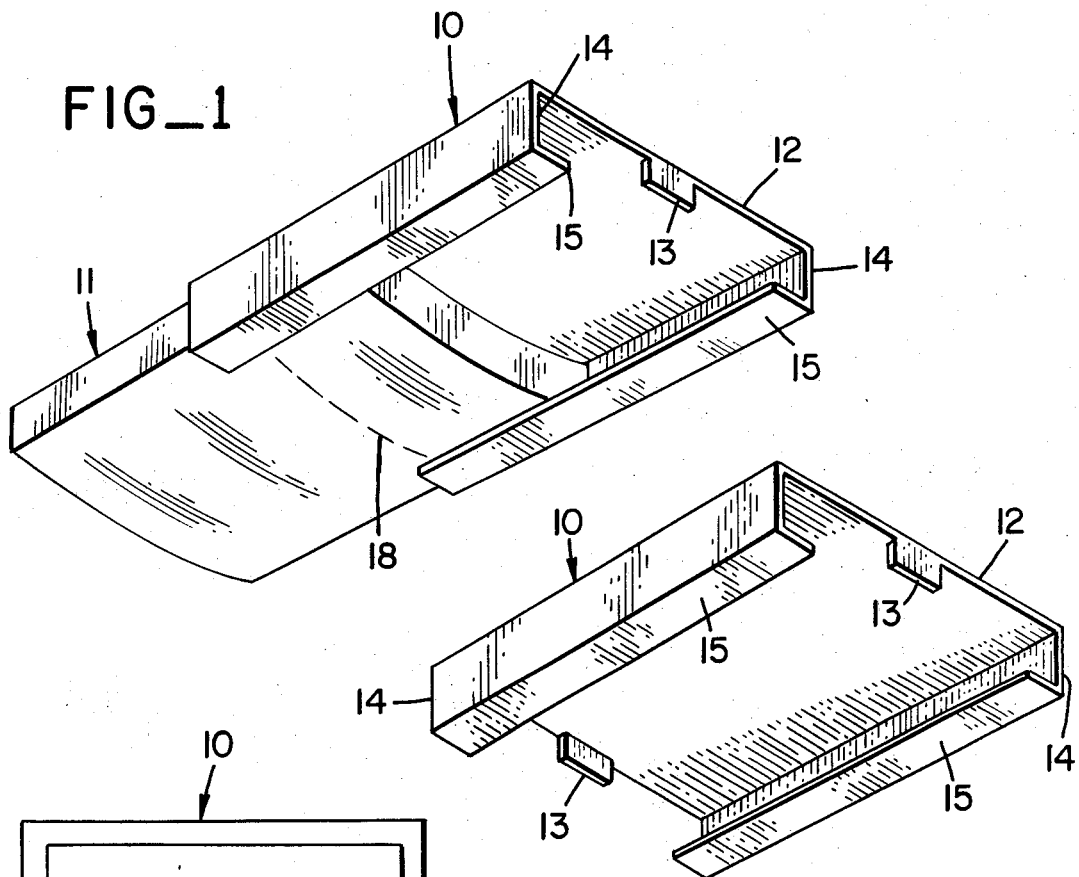
FIG_1
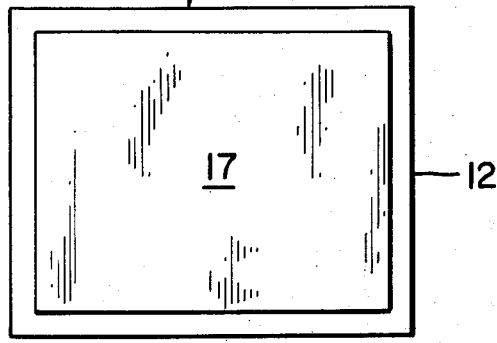
FIG_3
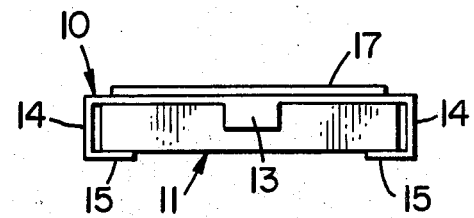
FIG_2
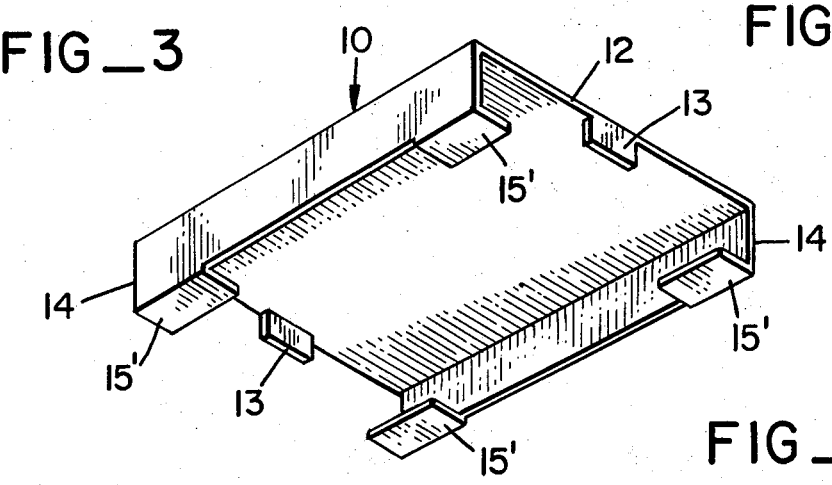
FIG_4
FIG_5

VAPOR RELEASING DEVICE

BACKGROUND OF THE INVENTION

This invention relates to devices for slowly releasing vaporous materials into the surrounding environment. More particularly this invention relates to devices comprising a holder having engaged therein a flexible solid containing a vaporous material such as a pesticide or reodorant.

A problem common to both homeowners and industry is the control of pests such as houseflies, mosquitoes and the like within a closed environment. A similar problem is in masking or removing offensive odors also within a closed space. Various methods have been used to control both problems. For example, aerosol sprays have been developed to dispense a fine mist within the closed environment; however such a method of application is of limited duration and effectiveness and requires frequent repetition.

Devices have been used which provide for a slow but continuous release of a vaporous material into the atmosphere. One such device comprises a liquid impregnated on an absorbent material from which the liquid slowly evaporates. More recent devices have included the use of solid materials containing a liquid having a relatively high vapor pressure. Among such items are thermoplastic resins containing within the resin matrix a liquid pesticide or reodorant which slowly diffuses through the plastic matrix to the surface then into the surrounding atmosphere.

A particular problem has been the control of pests and/or odors in environments of limited space such as in garbage cans or other trash disposal containers. In these situations odors and insect pests are not only offensive but may also be harmful. Conventional methods of controlling pests and odors such as sprays and commercially available slow release products are not satisfactory. Aerosols are of limited duration. Slow release products are generally placed or hung in an out-of-the-way place. Trash containers or other environments of limited space have virtually no areas not subject to being disturbed and are often subjected to rough handling, thereby rendering the use of current slow release products difficult.

DESCRIPTION OF THE INVENTION

A vapor releasing device has now been developed which may be used in any environment but is particularly adapted for use in areas of limited space. This device may be used to dispense one or more types of vapors.

The accompanying drawings illustrate various embodiments of the invention.

FIG. 1 is a perspective view of a simple embodiment of the vapor releasing device utilizing a single flexible solid partially engaged in the holder.

FIG. 2 is an end elevational view of a simple embodiment of the vapor releasing device utilizing a single flexible solid engaged in the holder.

FIG. 3 is a top elevational view of the vapor releasing device having one form of attaching means.

FIG. 4 is a perspective view of the holder showing the downwardly extending posts at each end of the slot.

FIG. 5 is a perspective view of the holder shown in FIG. 4 but having interrupted inwardly protruding lips.

Corresponding reference characters indicate corresponding parts throughout the several views of the drawings.

The vapor releasing device as illustrated comprises a holder 10 and a flexible solid 11 containing a vapor releasing material. Holder 10 is made out of metal, plastic, cardboard, or other appropriate material. Preferably holder 10 is made of a flexible plastic. Holder 10 consists of a flat upper portion 12, which may be of any desired shape but for purposes of illustration is shown as a rectangle, having opposing downwardly extending walls 14 containing inwardly protruding lips 15. The inwardly protruding lips 15 run longitudinally along wall 14 and may be continuous as illustrated in FIG. 4 or may be interrupted to form two or more protrusions 15' as shown in FIG. 5. The area enclosed by the upper portion 12, the downwardly extending walls 14 and inwardly protruding lips 15 forms a slot in which flexible solid 11 can be engaged. Extending downwardly from the upper portion 12 at the ends thereof and at right angles to the downwardly extending walls 14 are posts 13 which may be longitudinally aligned with each other or offset which serve to hold flexible solid 11 in place and prevent accidental removal or fallout of the solid. Flexible solid 11 is the same shape as the slot defined and is the same size as the slot or preferably slightly larger so that it will be firmly engaged in holder 10. Flexible solid 11 can be made of any material which will hold a vaporous chemical such as a reodorant or a pesticide. Materials such as cellulose, natural and synthetic rubber and synthetic polymers or resins can be used. Particularly preferred are thermoplastic resins such as polyvinyl halides, e.g., plasticized polyvinyl chloride. Flexible solid 11 is engaged in holder 10 so that the upper portion of said solid is in contact with the underside of upper portion 12 and the lower outer portion of solid 11 is in contact with the upper portion of lips 15. The sides of solid 11 may also be in contact with the inner surface of walls 14. The ends of solid 11 are in contact with posts 13 or are in close proximity thereto. In this manner the solid 11 is held firmly in place. Holder 10 is so designed that solid 11 has air circulation over the bottom surfaces thereof.

Holder 10 contains on the upper flat portion 12, or on any other attachable plane vertical, horizontal or diagonal that permits adequate attachment of the holder 10, means 17 for attaching said holder to a supporting surface. Such surface may be the under side of the conventional garbage can lid or any other location on a garbage container or a supporting frame for disposable garbage containers that would provide the maximum generating function of the flexible solids 11 without interference from the adjacent container walls or its contents whereby such interference would cause a premature separation of the holder 10 with the removal of the garbage. One such means is a double back adhesive tape, having a thin foam cushion between the two adhesive surfaces. One side of the tape is attached to holder 10 and the other side to the supporting surface. Other means such as other adhesives in tape, liquid or paste form or any known mechanical connector such as rubber bands, magnets straps, slots or snap-on or screw-on retaining means may be used to attach holder 10 to a supporting surface.

Flexible solid 11 may be fabricated in one or more pieces. For example, solid 11 may be divided into two sections or pieces along line 18 perpendicular to lip 15.

One section could contain one vaporous chemical such as an insecticide and the other section may contain a second chemical such as a reodorant.

A further embodiment of the invention wherein two different flexible solids are employed is accomplished by making holder 10 out of an appropriate material capable of containing a vaporous chemical such as a pesticide or reodorant. Hence holder 10 becomes one vapor releasing flexible solid and flexible solid 11 the other.

The above described vapor releasing devices are described as being adapted for use in closed spaces and in garbage or trash cans in particular. It is obvious that the supporting surface to which they are attached could be in any desired environment such as rest rooms, hospital rooms, bathrooms, hospitals, hotels, motels, homes and offices.

It is obvious that various changes could be made in the construction and shape of the vapor releasing devices without departing from the scope of the invention. The above description and attached drawings are considered to be illustrative of the invention only and not limiting.

We claim as our invention:

1. A vapor releasing device comprising a flat upper portion having opposing downwardly extending walls; said walls containing inwardly protruding lips running longitudinally along said walls thereby forming an open-ended slot; said upper portion having downwardly extending posts at each end of said slot and at right angles to said downwardly extending walls; said slot holding a flexible solid containing a vapor releasing material which flexible solid supportingly rests on said inwardly protruding lips and is held in place by engagement with the flat upper portion and downwardly extending posts.

2. A vapor releasing device according to claim 1 wherein said device has means for attaching said device to a supporting surface.

3. A vapor releasing device according to claim 1 wherein the flexible solid is a thermoplastic resin.

4. A vapor releasing device according to claim 3 wherein the vapor releasing material is a pesticide.

5. A vapor releasing device according to claim 4 wherein the vapor releasing material is a reodorant.

6. A vapor releasing device according to claim 5 wherein the thermoplastic resin is in two pieces, the dividing line between said pieces being in a plane perpendicular to said inwardly protruding lips.

7. A vapor releasing device according to claim 6 wherein one thermoplastic resin contains a pesticide as the vapor releasing material and the second thermoplastic resin contains a reodorant as the vapor releasing material.

8. The vapor releasing device according to claim 7 wherein the thermoplastic resin is plasticized polyvinyl chloride.

9. The vapor releasing device according to claim 2 wherein the attaching means is a double back adhesive tape.

10. A pesticide vapor releasing device suitable for use in garbage cans comprising a flat upper portion having means for attaching said device to the inside of a garbage can and having downwardly extending walls containing inwardly protruding lips running longitudinally along the walls thereby forming a slot which is open at least at one end, said flat upper portion having a downwardly extending post at the open end of the slot and at right angles to the downwardly extending walls, said slot holding a flexible solid thermoplastic resin containing a vaporizable pesticide which supportingly rests on the inwardly protruding lips and is held in place by engagement with the flat upper portion and downwardly extending post, the bottom surface of the solid flexible thermoplastic resin being substantially exposed to air circulation thereby releasing pesticide vapors to the inside of the garbage can.

11. The vapor releasing device according to claim 10 wherein the thermoplastic resin is plasticized polyvinyl chloride.

12. The vapor releasing device according to claim 11 wherein the attaching means is a double back adhesive tape.

* * * * *